US012688363B2

(12) United States Patent
Njelita et al.

(10) Patent No.: US 12,688,363 B2
(45) Date of Patent: Jul. 21, 2026

(54) SYSTEMS AND METHODS FOR IDENTIFYING AND ANALYZING RISK EVENTS FROM DATA SOURCES

(71) Applicant: Tata Consultancy Services Limited, Mumbai (IN)

(72) Inventors: Charles Njelita, Edison, NJ (US); Sukadev Khatua, Bhubaneswar (IN); Yibei Ling, Edison, NJ (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 240 days.

(21) Appl. No.: 18/421,095

(22) Filed: Jan. 24, 2024

(65) Prior Publication Data

US 2024/0311567 A1 Sep. 19, 2024

(30) Foreign Application Priority Data

Mar. 14, 2023 (IN) .............................. 202321016951

(51) Int. Cl.
*G06F 40/289* (2020.01)
*G06F 16/353* (2025.01)
*G06F 40/30* (2020.01)

(52) U.S. Cl.
CPC .......... *G06F 40/289* (2020.01); *G06F 16/353* (2019.01); *G06F 40/30* (2020.01)

(58) Field of Classification Search
CPC ...... G06F 40/289; G06F 16/353; G06F 40/30; G06F 40/284; G06Q 10/0635
See application file for complete search history.

(56) References Cited

U.S. PATENT DOCUMENTS

2010/0312769 A1* 12/2010 Bailey ................... G06F 16/285
707/769
2012/0316916 A1 12/2012 Andrews et al.
(Continued)

FOREIGN PATENT DOCUMENTS

CN 115017303 A * 9/2022 ............. G06F 40/30
IN 202141022951 6/2021

OTHER PUBLICATIONS

Erna Daniati et al., "Decision Making Framework Based On Sentiment Analysis in Twitter Using SAW and Machine Learning Approach," 3rd International Conference on Information and Communications Technology (ICOIACT), 2020, http://repository.unpkediri. ac.id/4189/3/ErnaDaniati-ICOIACT-2020.pdf.

*Primary Examiner* — Bhavesh M Mehta
*Assistant Examiner* — Jangwoen Lee
(74) *Attorney, Agent, or Firm* — FINNEGAN, HENDERSON, FARABOW, GARRETT & DUNNER LLP

(57) ABSTRACT

Conventional methods of analyzing social media content involves performing sentimental analysis to understand related sentiment and effects of events on communities. However, such analysis may not be completely accurate and are prone to errors. Present disclosure provides system and method that identify and analyze risk events from data collected from various sources. Key phrases obtained from sources is received, pre-processed, and clustered accordingly. The clustering is performed based on frequency of incoming words. The clustered dataset obtained is classified into one or more categories based on a polarity score. Dataset of specific category (e.g., negative category dataset) is analysed to identify events and topics which are then grouped using an associated label to obtain grouped entities. Each entity is then ranked and assigned a risk score for identifying high-risk events which are then analyzed using (Continued)

receiving one or more key phrases extracted from at least one source ~202 pre-processing the one or more key phrases to obtain a set of pre-processed key phrases ~204 clustering the set of pre-processed key phrases based on frequency of one or more incoming words comprised in the one or more key phrases to obtain a clustered dataset ~206 classifying the clustered dataset based on a polarity score into one or more categories ~208 identifying one or more events and one or more topics classified as a negative category amongst the one or more categories ~210 grouping the one or more events and the one or more topics using an associated label and a frequency of an incoming content stream from the at least one source to obtain a set of grouped entities ~212 ranking and assigning a risk score to each entity from the set of grouped entities based on one or more event ranking rules ~214 identifying one or more high-risk events from the set of grouped entities based on the assigned risk score ~216 analyzing the one or more high-risk events by using one or more simulation and optimization techniques ~218 simulation and optimization technique(s) and an explainability text for the analyzed risk events is generated.

14 Claims, 2 Drawing Sheets

(56)  References Cited

U.S. PATENT DOCUMENTS

| 2014/0156340 A1* | 6/2014 | Kern ..................... G06Q 40/00 |
| | | 705/7.28 |
| 2016/0371618 A1 | 12/2016 | Leidner et al. |
| 2021/0209307 A1 | 7/2021 | Serna |

* cited by examiner

SYSTEM
100

MEMORY
102

DATABASE
108

HARDWARE
PROCESSOR(S)
104

INTERFACE(S)
106

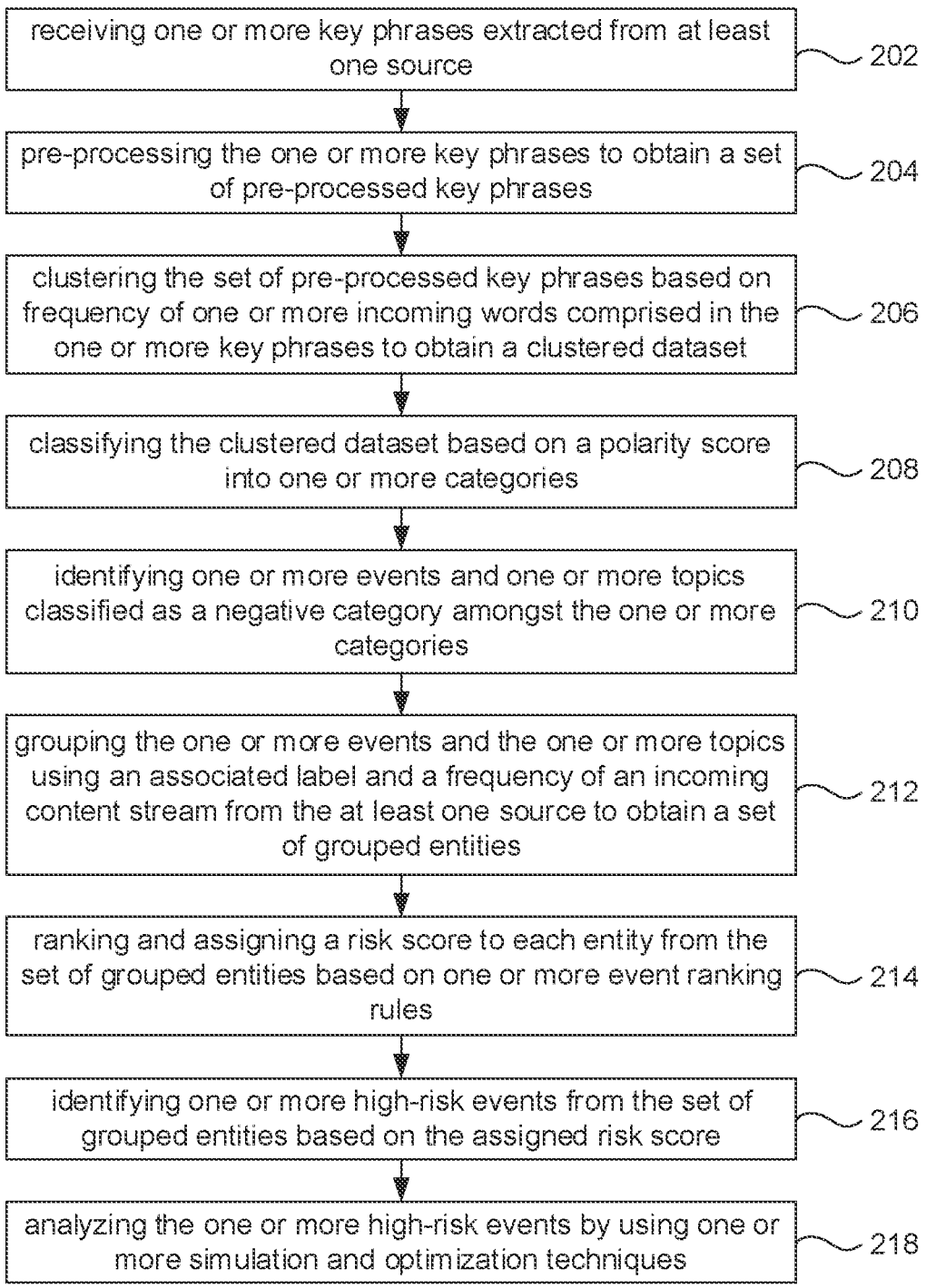

receiving one or more key phrases extracted from at least one source ⟿ 202 pre-processing the one or more key phrases to obtain a set of pre-processed key phrases ⟿ 204 clustering the set of pre-processed key phrases based on frequency of one or more incoming words comprised in the one or more key phrases to obtain a clustered dataset ⟿ 206 classifying the clustered dataset based on a polarity score into one or more categories ⟿ 208 identifying one or more events and one or more topics classified as a negative category amongst the one or more categories ⟿ 210 grouping the one or more events and the one or more topics using an associated label and a frequency of an incoming content stream from the at least one source to obtain a set of grouped entities ⟿ 212 ranking and assigning a risk score to each entity from the set of grouped entities based on one or more event ranking rules ⟿ 214 identifying one or more high-risk events from the set of grouped entities based on the assigned risk score ⟿ 216 analyzing the one or more high-risk events by using one or more simulation and optimization techniques ⟿ 218

FIG. 2

SYSTEMS AND METHODS FOR IDENTIFYING AND ANALYZING RISK EVENTS FROM DATA SOURCES

PRIORITY CLAIM

This U.S. patent application claims priority under 35 U.S.C. § 119 to: Indian Patent Application No. 202321016951, filed on Mar. 14, 2023. The entire contents of the aforementioned application are incorporated herein by reference.

TECHNICAL FIELD

The disclosure herein generally relates to social data analysis, and, more particularly, to systems and methods for identifying and analyzing risk events from data sources.

BACKGROUND

With the advent of technology, amount of data generation on a daily basis tends to grow exponentially with increasing pace. For instance, content generated from various sources such as social media sites, new websites, and so on has vast information and is diverse in nature. However, time and effort to analyse such data is humongous. Therefore, it is imperative that such data needs to be collected, classified, and processed accordingly to identified various events that are either occurring presently or are occurring in future. These events may be having various risk attributes low, medium, high, and so on. Sentimental analysis has been carried out in the past to understand various related sentiment and effects of such events on various communities. However, such analysis may not be completely accurate and are prone to errors.

SUMMARY

Embodiments of the present disclosure present technological improvements as solutions to one or more of the above-mentioned technical problems recognized by the inventors in conventional systems.

For example, in one aspect, there is provided a processor implemented method for identifying and analyzing risk events from data sources. The method comprises receiving, via one or more hardware processors, one or more key phrases extracted from at least one source; pre-processing, via the one or more hardware processors, the one or more key phrases to obtain a set of pre-processed key phrases; clustering, via the one or more hardware processors, the set of pre-processed key phrases based on frequency of one or more incoming words comprised in the one or more key phrases to obtain a clustered dataset; classifying, via the one or more hardware processors, the clustered dataset based on a polarity score into one or more categories; identifying, via the one or more hardware processors, one or more events and one or more topics classified as a negative category amongst the one or more categories; grouping, via the one or more hardware processors, the one or more events and the one or more topics using an associated label and a frequency of an incoming content stream from the at least one source to obtain a set of grouped entities; ranking and assigning, via the one or more hardware processors, a risk score to each entity from the set of grouped entities based on one or more event ranking rules; identifying, via the one or more hardware processors, one or more high-risk events from the set of grouped entities based on the assigned risk score; and analyzing, via the one or more hardware processors, the one or more high-risk events by using one or more simulation and optimization techniques.

In an embodiment, the one or more topics are identified using one or more statistical techniques.

In an embodiment, one or more events comprised in the set of grouped entities are ranked based on at least one of an associated criticality value and an associated importance value.

In an embodiment, the risk score is assigned based on at least one of a frequency and a severity associated with each entity from the set of grouped entities.

In another aspect, there is provided a processor implemented system for identifying and analyzing risk events from data sources. The system comprises: a memory storing instructions; one or more communication interfaces; and one or more hardware processors coupled to the memory via the one or more communication interfaces, wherein the one or more hardware processors are configured by the instructions to: receive one or more key phrases extracted from at least one source; pre-process the one or more key phrases to obtain a set of pre-processed key phrases; cluster the set of pre-processed key phrases based on frequency of one or more incoming words comprised in the one or more key phrases to obtain a clustered dataset; classify the clustered dataset based on a polarity score into one or more categories; identify one or more events and one or more topics classified as a negative category amongst the one or more categories; group the one or more events and the one or more topics using an associated label and a frequency of an incoming content stream from the at least one source to obtain a set of grouped entities; rank and assign a risk score to each entity from the set of grouped entities based on one or more event ranking rules; identify one or more high-risk events from the set of grouped entities based on the assigned risk score; and analyze the one or more high-risk events by using one or more simulation and optimization techniques.

In an embodiment, the one or more topics are identified using one or more statistical techniques.

In an embodiment, one or more events comprised in the set of grouped entities are ranked based on at least one of an associated criticality value and an associated importance value.

In an embodiment, the risk score is assigned based on at least one of a frequency and a severity associated with each entity from the set of grouped entities.

In yet another aspect, there are provided one or more non-transitory machine-readable information storage mediums comprising one or more instructions which when executed by one or more hardware processors cause identifying and analyzing risk events from data sources by receiving one or more key phrases extracted from at least one source; pre-processing the one or more key phrases to obtain a set of pre-processed key phrases; clustering the set of pre-processed key phrases based on frequency of one or more incoming words comprised in the one or more key phrases to obtain a clustered dataset; classifying the clustered dataset based on a polarity score into one or more categories; identifying one or more events and one or more topics classified as a negative category amongst the one or more categories; grouping the one or more events and the one or more topics using an associated label and a frequency of an incoming content stream from the at least one source to obtain a set of grouped entities; ranking and assigning a risk score to each entity from the set of grouped entities based on one or more event ranking rules; identifying one or more high-risk events from the set of grouped entities based on the assigned risk score; and analyzing the one or more high-risk events by using one or more simulation and optimization techniques.

In an embodiment, the one or more topics are identified using one or more statistical techniques.

In an embodiment, one or more events comprised in the set of grouped entities are ranked based on at least one of an associated criticality value and an associated importance value.

In an embodiment, the risk score is assigned based on at least one of a frequency and a severity associated with each entity from the set of grouped entities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 depicts an exemplary flow chart illustrating a method for identifying and analyzing risk events from data extracted from sources, using the system of FIG. 1, in accordance with an embodiment of the present disclosure.

DETAILED DESCRIPTION

Figure 1:
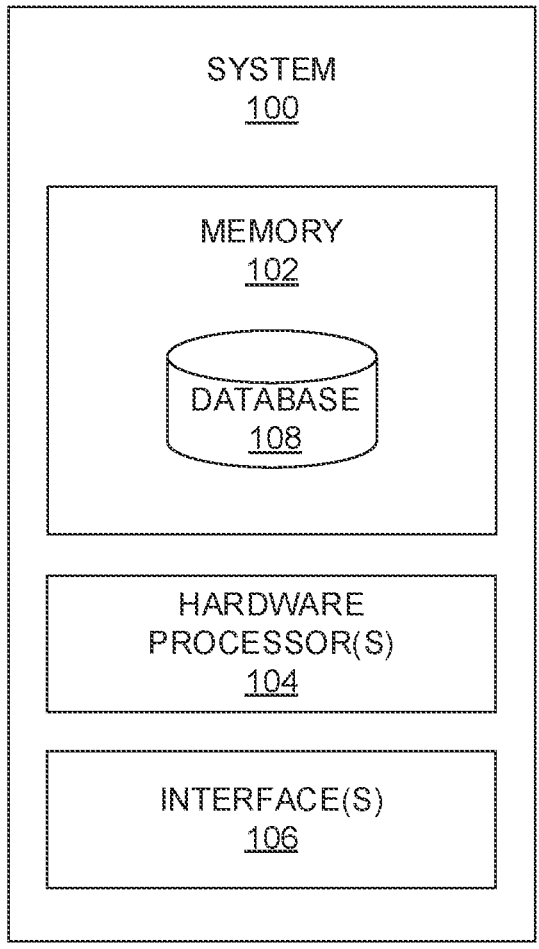
FIG. 1 depicts an exemplary system for identifying and analyzing risk events from data extracted from sources, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned above, the amount of data generation on a daily basis tends to grow exponentially with increasing pace. For instance, content generated from various sources such as social media sites, new websites, and so on has vast information and is diverse in nature. Therefore, it is imperative that such data needs to be collected, classified, and processed accordingly to identify various events that are either occurring presently or will occur in the future. These events may have various risk attributes low, medium, high, and so on. Sentimental analysis has been carried out in the past to understand various related sentiment and effects of such events on various communities. However, such analysis may not be completely accurate and are prone to errors.

Embodiments of the present disclosure provide system and method that identify and analyze risk events from data collected from various sources. More specifically, the received input comprises of text which includes key phrases obtained from various sources (e.g., social media, news, blogs, images, videos, and the like). The received input is then pre-processed, and the pre-processed text phrases are then clustered based on frequency of one or more incoming words comprised in the one or more key phrases. The clustered dataset obtained therein is classified into one or more categories based on a polarity score. Such categories may include, but are not limited to positive category, negative category, neutral category, and the like. The negative category dataset is then further analysed to identify one or more events and one or more topics which are grouped using an associated label to obtain grouped entities. Then each entity in the grouped entities is ranked and assigned a risk score. Using the assigned risk score, one or more high-risk events are identified from the set of grouped entities. The system and method then perform simulation and optimization technique(s) and generate an explainability text that indicates or provides a reason/justification as to why certain events are identified as high-risk events.

Referring now to the drawings, and more particularly to FIG. 1 through 2, where similar reference characters denote corresponding features consistently throughout the figures, there are shown preferred embodiments and these embodiments are described in the context of the following exemplary system and/or method.

FIG. 1 depicts an exemplary system 100 for identifying and analyzing risk events from data extracted from sources, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises text phrases obtained from various data sources, one or images obtained from various data sources. The database 108 further comprises one or more statistical techniques, one or more simulation and optimization techniques, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method for identifying and analyzing risk events from data extracted from sources, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. An incident is an event that negatively affects a city or an urban area and impacts its business operations. It is an unplanned interruption or reduction in the quality of life in a city. It can be defined as any event (something happening at a specific time and place) of interest to the (news) and social media. An example of an event can be disease outbreak, civil unrest, earthquake, flooding, tornado, forest fire, school rampage shooting etc. Conceptually, an event is defined as follows:

$$E_i = (t, l, s)$$

Where $E_i$, is an ith event that happens at time $t \in T$, at location $l \in L$ with its semantic meaning $s \in S$. Also, note, T, L, and S represent the domains: time, location and semantic respectively. Thus, given an event indicator data (text or image) $X \subseteq T{-}xLxF$ and historical event data $E0 \subseteq T{-}xLxS$, an event prediction is a process that outputs a set of predicted future event $\hat{E} \subseteq T{-}xLxS$, such that for each predicted future event $\hat{e} = (t, l, s) \subseteq \hat{E}$ where $t > t_0$.

Below Table 1 indicates event Types that are detected using social media.

TABLE 1

| Frequency of incidents event | High | Medium | Low |
|---|---|---|---|
| High | | | Car accident, felony or misdemeanor, road pothole, |
| Medium | | Power outage, internet outage, public transportation problem, social and cultural gatherings, cultural events | |
| Low | Earthquake, civil unrest, disease outbreak, flooding, school shooting | | |

Above Table 1 presents the number of tweets defining an average incident event and how often or frequency of that event happening. For example, disease outbreaks, civil unrest or riot have low frequency and high number of tweets. While car accidents or fender benders or potholes on the road have high frequency but low number of tweets. The system 100 and method assume that low frequency events possess high risk to the city and low frequency incident events with low number of tweets possess low level risk to a city. News related events are posted in different types of social media platforms: Twitter®, YouTube®, Flickr®, Facebook®, Instagram® and the like. The task of extracting and annotating social media content surrounding an event is daunting.

Referring to steps of FIG. 2, at step 202 of the method of the present disclosure, the one or more hardware processors 104 receive one or more key phrases extracted from at least one source. The step of receiving (or extracting) one or more key phrases from at least one source includes data and content collections from social sensors sources such as social media sites, news media, satellite image sites and content validation from an authoritative source. In an embodiment of the present disclosure, key phrase extraction from social and news media, satellite and authoritative sources may be performed via application programming interface (API) as applicable. For instance, automatically extracted data from an internet website (e.g., say Twitter® developer site), API has no features to get text data from other social sites (like Twitter®, Facebook®, Instagram®, etc.) with one or more parameters such as a city name, a location, and a time stamp, a date stamp, and the like. The extraction of key phrases may also be obtained from an external text data file with different file formats such as comma separated value (csv), excel file, a sas7bdat format, pkl format, json format, and so on. Below exemplary pseudo code illustrates step of extracting or receiving key phrases from one or more data sources:

Following are the key and value pairs need to be defined in Application Programming Interface (API):

Consumer Key—Defined it as a string (example: Consumer Key=QlqgxxxXXXXXXXXXXXXXXXXXcQ Consumer Secret—Defined it as a string (example: Consumer Secret=R8xXXXXXXXXXXXXXXXXXXXxzk Access Token—Define it as a string (example: Access Token=140-JX8XXXXXXXXXXXXXXXXXXgA Access Secret—Define it as a string (example: Access Secret=aXXXXXXXXXXXXXXXXXXXXXXXXXbA Days Ago—Defined it as an integer (example: Days ago=1)

Geo Code—Defined it as a string with comma separator (example: Geo Code=40.75, −73.98,150 km). It consists of longitude, latitude, and radius.

Max Tweets—Defined it as an integer (example: max_tweets=100)

Key Word Search—Defined it as a string (example: Key Word Search=@City 'x'Subway, @MTA)

Experiment Name—Defined it as a string (example: Experiment Name=Tweet)

Definition of Each Keys:

Consumer Key, Consumer Secret, Access Token, Access Secret—This information may be obtained from the source developer site and used for an authentication.

Days Ago—The number of day's key phrases are getting extracted from the users' tweets text data.

Geo Code—It is the longitude, latitude, and radius of the location.

Max Tweets—It is the number of tweets included per pages.

Key Word Search—It's a topic, product name, latest trending news, and so on.

For example: Sports (Cricket world cup), Election, Economy, Powered, Gatorade.

Experiment Name—The system 100 creates a folder and keeps all the necessary files and results in it for future reference.

OUTPUT—The system 100 creates a specific file (e.g., a JSON file) which is stored in the location "folder_name/inputDB."

Backend Command executed Automatically—python social_sensor_client.py getdata twitterargs At step 204 of the method of the present disclosure, the one or more hardware processors 104 pre-process the one or more key phrases to obtain a set of pre-processed key phrases. In an embodiment of the present disclosure, the step of pre-processing includes operatively communicating by the system 100 using an appropriate API (e.g., say client API_102) wherein an interface is facilitated by the system 100 to enter predefined monitoring, and search criteria. For instance, search criteria may include, location (longitude, latitude), key words and tine (t0) parameter social news and media sites for receiving the key phrases and pre-processing. Using a social website such as a Twitter® website as an example, the following may be provided as input to the system: 1) Location (longitude and Latitude): Example @ City'x'Subway, @City'x'Schools, @City'x', City'x' state, USA, and 2) Target events type: #traffic, #trainschedule, #busschedule, #schoolshooting, #power outage, #blackout #City 'x' poweroutage #City'x'blackout, #Internetoutage, #City'x'trafficjam, #City 'x' poweroutage, #City'x'disease, #City'x'outbreak, #accident, #epidemics, #Covid, #Terrorism, #Riot, #unrest, #flooding, #Forestfire, #earthquake, etc. Key phrases with such target event types are extracted from the various sources (e.g., Twitter® in this case) and accordingly the key phrases are pre-processed using as known in the art pre-processing techniques to obtain the set of pre-processed key phrases. The step of pre-processing the one or more key phrases to obtain the set of pre-processed key phrases is better understood by way of following description. The process of identifying events using extracted texts and/or images within certain time window ($W_t$) of the day known as burst events detection called feature-Pivot clustering technique. To identify the most active period of incident event on the social media (i.e., Twitter®) requires three steps: (a) identify bursty feature ($f_j$) over a window ($W_t$) using a feature Gaussian distribution as known in the art. The Gaussian distribution has two parameters: mean and standard deviation (SD), (b) grouping similar bursty features, (c) determining hot periods of the burst. Below pseudo code illustrates the step of pre-processing the key phrases:

1. Creating data frame, wherein a pandas dataframe is created by using the extracted file (like outputs of step 202) or external file.
2. Create a config file based on the following information. Following are the key and value pair need to be defined:
   a. File Name—Defined it as a string (ex: File Name=Extracted_Tweet_data.json)
   b. In case of tweet experiment this file name always as "Extracted_+folder_name+_data.json", where folder_name is the name you provided in STEP-1
   c. Experiment Name—Defined it as a string (example: Experiment Name=Tweet)
   d. If step 1 is carried out, then there is no need to provide the folder name, in case there is an external file then the folder name is provided.

Definition of Each Keys:

File Name—It is the name of the filename which have the text data.

Experiment Name—It is the name of the folder where all the experiment outputs will be stored.

OUTPUT—It creates a binary file by using the pandas dataframe (location-"folder_name/outputDB")

Backend Command executed Automatically—python social_sensor_client.py dataframe dfargs.

In last click on "CreateDF" button to create the input data into the pandas dataframe 3. Cleaning of Text wherein the text is cleaned before using by the system 100. A config file is created based on the following information. Following are the key and value pair need to be defined:
   a. Text Column Name—Defined it as a string (example: Text Column Name=tweetText)
   b. Target Variable—Defined it as a string (ex: Target Variable=Label)
   c. Polarity Method—Defined as a string (ex: Polarity Method=textblob)
   d. Keep Columns—Define as a string with comma separated (ex: Keep Columns: Message, Answer, Category, Label')
   e. target_var and polarity_method is dependent on each other. If you have the label data then don't use polrity_method else use target_var.

If the data is not labeled, as known in the art polarity method may be implemented by the system 100 and method of the present disclosure. Further, based on a polarity score the data is further labeled automatically. It is recommended to use labeled data to train any supervised machine learning model.

Definition of Keys:

Text Column Name—It is the name of the column from the dataframe which contains the text Target Variable—It is the name of the dependent variable (Label) of the data Polarity Method—two methods used by the system to find the polarity score and label each data points (e.g., method1-textblob, and method2-vader)

Keep Columns—It is the list of columns which we need to keep in the dataframe

OUTPUT—It will create the dataframe after cleaning the text and a new column is added as "Cleantxt" for the cleaned text to the dataframe Backend Command executed Automatically—python social_sensor_client.py textprocessing textprocessingargs Pre-processing of the key phrases also includes removal of special characters, uniform resource locators (URLs), and so on.

4. The text or key phrases are further tokenized, and the step of tokenization involves removal of the stopwords from the text as well. Further, config file is generated based on the following information. Following are the key and value pair need to be defined:
   a. Select The Text Column—Defined as it as a string (example: Select The Text Column=Cleantxt)
   b. Stop Words—Define it as a string (example: Stop Words=Yes)

Definition of Keys:

Select The Text Column: It is the column which contains the clean text of the data Stop Words: Excluding/Including of stop words from the text while tokenization If stop words are removed from the argument file then the text will be tokenized only and not exclude the stop words.

OUTPUT—It will tokenize the text and create a new column as "tokenize" in the dataframe Backend Command executed Automatically-python social_sensor_client.py tokenizetext tokenizeargs Referring to steps of FIG. 2, at step 206 of the method of the present disclosure, the one or more hardware processors 104 cluster the set of pre-processed key phrases based on frequency of one or more incoming words comprised in the one or more key phrases to obtain a clustered dataset. At step 208 of the method of the present disclosure, the one or more hardware processors 104 classify the clustered dataset based on a polarity score into one or more categories. An example of an event was using social media i.e., a tweet to capture covid 19 pandemic disease outbreak in 2020. The pandemic event impacted economy of many cities and states in USA. Below Table 2 lists the clustered dataset with example of tweets extracted with social media's API (e.g., say Twitter® API) and classification of the clustered dataset based on the polarity score into the one or more categories.

events and the one or more topics using an associated label and a frequency of an incoming content stream (e.g., key phrases or images) from the at least one source to obtain a set of grouped entities. In the present disclosure, a label refers to "an in-comment text or image" that can be classified. For instance, the label could be specified as COVID related document/text, or unemployment related text, and so on. Events or an incident in a certain geographical and time triggers discussion or comments in social and or news media

TABLE 2

| Date/time | Tweets | Top Word/Phrase Frequency Across Data | Sentiment | Polarity Score | Topics | Event | Risk Factor | Explain ability |
|---|---|---|---|---|---|---|---|---|
| 20-04-20 | @ABC bank: Are there discussions to waive online fees during time of #COVID 19? | COVID | Positive | 0.9 | Banking, COVID | COVID | | COVID situation |
| 18-10-21 | RT @XYZ: Unemployment rate is dropping but these people are not telling it, as people only work for x-y hours per week | Unemployment | Negative | −0.1 | Unemployment | Economic Recession | | Unemployment dropping |
| 26-11-21 | RT @John Doe: 13 states recorded low unemployment rates (since year according to @User1, as per state report released | 13 States | Negative | 0.15 | State Unemployment | Economic Condition | | low unemployment rates |

The above table may include date and timestamp, tweet identified, geolocation of tweets origination; top words or most frequent word; polarity assigned to the tweets; topic of discussion; event in question; risk score to the city or enterprise; and explainability of the citizens sentiment towards covid 19 pandemic outbreak as an event. In the above table, the one or more categories may include, such as disease outbreak, unemployment, and the like.

Referring to steps of FIG. 2, at step 210 of the method of the present disclosure, the one or more hardware processors 104 identify one or more events and one or more topics classified as a negative category amongst the one or more categories. The one or more topics are identified using one or more statistical algorithmic techniques: probabilistic latent semantic analysis (PLSA), Latent Discovery Allocation (LDA), Hierarchical latent tree analysis (HLTA), Random Projections (RP), Latent Semantic Indexing (LSI OR LSA), etc. The largest group with negative polarity or negative category is further analyzed as an event and passed downstream for generating alert(s). Then, rules governing events are grouped in three buckets: large, medium, and small events (e.g., categories) based on frequency of social media discussion or complaints in social media. Reports on an event include start time, detection time, set of correspondent comments regarding the event topic.

At step 212 of the method of the present disclosure, the one or more hardware processors 104 group the one or more by citizens of a city or state. Significance of an event is computed by the number of entities divided by topic occurrence over a time period. A topic is determined by identifying the words that are used with high frequency when people are commenting about the topic. Overall, an event can be identify using entity, topic clustering, and incidence peak detection. The first step in the process is to preprocess the document or content stream/key phrases as per the input received by the system 100 as described above. Secondly, use of technique(s) such as named entity recognition (NER), persons, organizations, locations, etc. are identified. Further, the system 100 invokes topic discovery techniques (as known in the art technique) that is stored in the memory 102 to identify one or more topics from the input (e.g., key phrases, stream of documents (i.e., tweets) and further identify semantic similarity among them. An example is disease outbreak or pandemic as a topic in a particular city or state (i.e., entity, Covid 19 pandemic) event in the Table 2 above. The Covid event triggers a sub-event, an economic crisis which impacts cities and states budgets which can be classified as a topic type (see table 2 below for event types). Events at a certain location and time share common features which can be reported as news stories, social media i.e., tweets, blogposts comments, etc.

In a nutshell, the step of pre-processing includes real-time event extraction from social or news media requiring automatic binary classification of corpora to filter-out non-event related text or image before analysis. An event can be classified based on the average number of tweets reporting an incident event and frequency of incoming tweets about the same topic. The system and method of the present disclosure assume that each subscribed user has a sensor which detects a target incident event. Also, the system and method of the present disclosure further assume that each tweet originates from a place and has a time stamp associated with it. The goal is to correctly estimating probability of an event and compare the values of an incoming data (X), $$P(e) = f(\text{Yes} \mid X) \text{ and } f(y = \text{No} \mid X)$$

Where the left-side denotes the probability score, or likelihood of a given event occurrence given X while the right-side corresponds to no events happening.

In the present disclosure, the system 100 can implement and execute a transfer-based framework which can be used to conduct unsupervised pre-training. The transformer for time series uses positional encoding to track data words in a sentence in real-time instead of sequential treatment of words. Sentences or documents and images polarity (positive, negative, neutral) can be captured without retraining a machine learning (ML) model stored in the memory 102 herein and invoked for execution accordingly. Emerging events are dynamical phenomena which represent a group of synchronous variables over time. Example, the case of emergency event like flooding, earthquakes, weather forecasting, or disease outbreak in a city can be detected and tracked in near real-time. Transformers architectural model for multivariate time series is better suited to identify incident events in social media stream than classical Convolutional Neural Network (CNN), Recurrent Neural Network (RNN), and Long-Short Term Memory (LSTM) and Gated Recurrent Units (GRU) since it does need to process data sequentially. CNN uses numerous words embedding architecture to classify text and image for the preprocessing of input event data. The transformer-based time series representation learning model uses Bidirectional Encoder Representations from Transformers (BERT) like framework which allows for unsupervised pre-training. The transformer architecture (not shown in FIGS.) is based on finding correlations between various input segments using dot products. The self-attention operation of transformer makes ideal for solving real-time event detection. Let $$x_{i=1}^{n}, x \in \mathcal{R}^{d}$$

be a set of n words in a single sequence, i represents the position of the vector $x_i$ is position of the word in the sentence of the word sequence. Thus, the self-attention operation is the weighted dot product of these input vectors x; with each other. With minor medication or fine tuning, it can be used for downstream tasks like incident event sentiment classification and prediction.

At step 214 of the method of the present disclosure, the one or more hardware processors 104 rank and assign a risk score to each entity from the set of grouped entities based on one or more event ranking rules. For example, rules may include, such as rule x: if the event type power outage, then the risk type may be low or high depending upon the associated impact thereof, rule y: if the event type is internet outage, then the risk type may be low or high depending upon the associated impact thereof (e.g., any lack in communication skills or sending business proposals via mail channels may lead to losing a potential customer and hence the impact on an organization may also be high, and therefore the risk type may either be high or medium). Below Table 3 describes some exemplary rules and associated impact for one or more event types. In the present disclosure one or more events comprised in the set of grouped entities are ranked based on at least one of an associated criticality value and an associated importance value. Critical value may be of various ranges. For example, low critical values may range from 0 to 0.5, medium critical value may range from 0.5 to 0.75, and high critical value may range from 0.76 to 1.0. Importance value is based on an impact of an asset. For instance, during power outage, if any of the servers are down for maintenance in a data centre, importance value for such an asset can be very high (e.g., may range from say x to y, wherein value of x and y may be between 0.76 to 1.0). It is to be understood by a person having ordinary skill in the art or person skilled in the art that such critical values and importance values shall not be construed as limiting the scope of the present disclosure. In other words, the critical values and importance values can take any numerical value based on the implementation and deployment of the system and the method of the present disclosure in a specific environment and/or infrastructure.

At step 216 of the method of the present disclosure, the one or more hardware processors 104 identify one or more high-risk events from the set of grouped entities based on the assigned risk score. The steps of 214 and 216 are better understood by way of following description. The risk score is assigned based on at least one of a frequency and a severity associated with each entity from the set of grouped entities. The system 100 continuously generates incidence events list every 'x' time interval (e.g., 1 hour window) and probability of occurrence. Risks in a city context are assessed as combination of hazard and vulnerability. Hazard is combination of intensity and frequency of the phenomena at question. Vulnerability is damages and values assessment of elements at risk (r) and is a combination of exposure and potential losses if the incident event occurs. Risk is defined as probability x loss, where loss refers to the financial loss measured by many factors: lock-down of a facility and low productivity due to an event occurrence, pandemic of a disease, natural disaster. Mathematically, risk in city context may be defined just like in any industrialized society can computed, and is expressed as follows:

$$\text{Risk} = \sum_{r} (\text{Frequency} \otimes Severity)$$

Where r=whole sets of elements at risk, frequency is how often the events occur, severity is combination of intensity, damages, and value of the assets damaged. Risk can be ranked based on where resources may be needed to manage or mitigate the realization of high probability/high consequence risk. Risk Table 3 is generated from Table 1 event types using the following equation.

TABLE 3

| Event # | Risk Type | Known Source | Proba- bility | Likeli- hood | Impact |
|---------|-----------|--------------|---------------|--------------|--------|
| 1 | Power outage | Thunderstorm | 0.10 | Low | Medium |

TABLE 3-continued

| Event # | Risk Type | Known Source | Proba-bility | Likeli-hood | Impact |
|---------|-----------|--------------|--------------|-------------|--------|
| 2 | Internet outage, | Weather - Hurricane | 0.20 | Low | Medium |
| 4 | Bus/Train delay | Music Festival event | 0.50 | Medium | Low |
| 5 | Traffic | Accident on I95 | 0.90 | High | Low |
| 6 | Felony or misdemeanor | Prisoner Escape | 0.20 | Low | High |
| 7 | School shooting risk | Not available | 0.20 | Low | High |
| 8 | Flood Risk | Global warming | 0.50 | Medium | High |
| 9 | Disease outbreak (e.g., Polio, Monkey Pox) | Not available | 0.80 | High | Medium |
| 10 | Civil unrest | Police Brutality | 0.20 | Low | High |
| 11 | Earthquake, | Not available | 0.05 | Low | High |

At step 216 of the method of the present disclosure, the one or more hardware processors 104 identify one or more high-risk events from the set of grouped entities based on the assigned risk score. Above Table 3 illustrates risk events being identified.

At step 218 of the method of the present disclosure, the one or more hardware processors 104 analyze the one or more high-risk events by using one or more simulation and optimization techniques. In addition to analysing the one or more high-risk events, the system 100 also generates an explainability pertaining to the one or more high-risk events. The explainability text indicates or provides a reason/justi-fication as to why certain events are identified as high-risk events. From Table 2 explainability column uses Shapley values as known in the art, local explainability to indicate how a feature impacts the sentiment classification model prediction. Explainability is said to be local when the explainability is made for an individual prediction, in an embodiment of the present disclosure. For example, 'COVID situation' explained why the tweet on 20 Mar. 2022 (also referred as Apr. 20, 2022) has high risk factor and is negative (see table 2 for details). The explainability may be either local to the geography, applicable globally, or time based. The above step of analyzing the one or more high-risk events by using one or more simulation and optimization techniques is betted understood by way of following description. If event risk reaches a critical threshold, "what if analysis" simulation and optimization technique is trig-gered in the case of high-risk event. For the high-risk events, "What If then Analysis" scenarios are simulated and opti-mized. Simulation scenario is better understood by way of following description:

Simulation Scenario (e.g., Covid pandemic): Start with a given or random generated set of simulation input values, simulation and optimization alternate until some termination condition is met. Mitigation idea is to make use of facility geographically distributed resource to mitigate the risk-induced impact. Optimize risk spreading strategy, such as spreading high risk projects to low-risk centers based on various profile dimensions like productivity, skill availabil-ity. Risk cost (RC): is the product of impact size (I) times likelihood of (P).

Optimization Scenario: Loss associated with an affected infrastructure (e.g., facility) is proportional to the resource available in that facility. Assume that the relationship is linear, loss~resource.

Total Risk (TR): $sum(P_i \times R_i) \sim sum(P_i \times l_i)$

The problem can be reduced to Linear Programming (LP) problem.

1. Minimize: $sum(P_i \times R_i)$
2. $l_i < R_i < U_i$, for $1 <= I <= n$
3. where $l_i$ and $U_i$ are the minimum/maximum resource (number of people) with respect to a facility, and probability $P_i$ denotes the likelihood of unexpected event occurred with respect to the facility.

It is to be noted that probability risk vector $p=(p_1, p_2, \ldots, p_n)$ can be updated in a periodic fashion, the lower and upper bounds at each facility can be modified. The risk mitigation can be extended to the project level. For example, the model is intact if the facility is replaced by the project. The formulation can be resolved efficiently with Quadratic Programming (QP) and convex programming can be used to solve the problem where the relationship between the loss and resource is not linear, which also is very efficient.

The written description describes the subject matter herein to enable any person skilled in the art to make and use the embodiments. The scope of the subject matter embodi-ments is defined by the claims and may include other modifications that occur to those skilled in the art. Such other modifications are intended to be within the scope of the claims if they have similar elements that do not differ from the literal language of the claims or if they include equiva-lent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by vari-ous components described herein may be implemented in other components or combinations of other components. For the purposes of this description, a computer-usable or com-puter readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongo-ing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, one or more key phrases extracted from at least one source, wherein receiving the one or more key phrases comprises collecting data and content from social sensor sources including social media sites, news media outlets, satellite imagery repositories via an Application Programming Interface (API), wherein key and value pairs are defined in the API;

pre-processing, via the one or more hardware processors, the one or more key phrases to obtain a set of pre-processed key phrases, wherein the pre-processing includes a real-time event extraction and operatively communicating through the API, wherein an interface is facilitated to enter a predefined monitoring and a search criteria of the one or more key phrases, wherein the step of pre-processing includes creating a data frame, creating a configuration file, wherein the configuration file is based on the key and value pairs defined as a file name and a experiment name, wherein the set of pre-processed key phrases is cleansed before using by a system based on the key and value pairs defined including a text column name, a target variable, a polarity method, wherein the target variable and the polarity method is dependent on each other, wherein the target variable is used in presence of a labelled data and when the labelled data is absent then the polarity method is implemented, wherein data is labelled using the polarity method by assigning a polarity score, wherein based on the polarity score the data is further labelled automatically and the labelled data is used to train a supervised machine learning model;

clustering, via the one or more hardware processors, the set of pre-processed key phrases based on frequency of one or more incoming words comprised in the one or more key phrases to obtain a clustered dataset;

classifying, via the one or more hardware processors, the clustered dataset based on a polarity score into one or more categories;

identifying, via the one or more hardware processors, one or more events and one or more topics classified as a negative category amongst the one or more categories, wherein the one or more events are identified by analyzing extracted textual content and images occurring within a defined time window of a day using a burst-event detection approach based on a feature-pivot clustering technique;

identifying an active period of an incident event on a social-media platform by identifying a bursty feature over the defined time window using a feature-based Gaussian distribution, and grouping the identified bursty features based on similarity and determining one or more hot periods corresponding to the bursty feature, wherein a transfer-based framework is configured to identify the incident event and perform unsupervised pre-training and the machine-learning model is invoked for execution;

grouping, via the one or more hardware processors, the one or more events and the one or more topics using an associated label and a frequency of an incoming content stream from the at least one source to obtain a set of grouped entities;

generating, an alert by analyzing a largest group of data items having negative polarity, wherein the alerts are generated based on frequency of social media complaints;

ranking and assigning, via the one or more hardware processors, a risk score to each entity from the set of grouped entities based on one or more event ranking rules;

identifying, via the one or more hardware processors, one or more high-risk events from the set of grouped entities based on the assigned risk score;

analysing, via the one or more hardware processors, the one or more high-risk events by using one or more simulation and optimization techniques; and generating, via the one or more hardware processors, an explainability text pertaining to the one or more high-risk events upon analysing the one or more high risk events, wherein the explainability text provides a reason or justification of the identified one or more high risk events, wherein the generated explainability is either local to a geography, applicable globally or time based.

2. The processor implemented method of claim 1, wherein the one or more topics are identified using one or more statistical techniques.

3. The processor implemented method of claim 1, wherein one or more events comprised in the set of grouped entities are ranked based on at least one of an associated criticality value and an associated importance value.

4. The processor implemented method of claim 1, wherein the risk score is assigned based on at least one of a frequency and a severity associated with each entity from the set of grouped entities.

17

5. A system, comprising:

a memory storing instructions;

one or more communication interfaces; and one or more hardware processors coupled to the memory via the one or more communication interfaces, wherein the one or more hardware processors are configured by the instructions to:

receive one or more key phrases extracted from at least one source, wherein receiving the one or more key phrases comprises collecting data and content from social sensor sources including social media sites, news media outlets, satellite imagery repositories via an Application Programming Interface (API), wherein key and value pairs are defined in the API;

pre-process the one or more key phrases to obtain a set of pre-processed key phrases, wherein the pre-processing includes real-time event extraction and operatively communicating through the API, wherein an interface is facilitated to enter a predefined monitoring and a search criteria of the one or more key phrases, wherein the step of preprocessing includes creating a data frame, creating a configuration file, wherein the configuration file is based on the key and value pairs defined as a file name and a experiment name, wherein the set of pre-processed key phrases is cleansed before using by a system based on the key and value pairs defined including a text column name, a target variable, a polarity method, wherein the target variable and the polarity method is dependent on each other, wherein the target variable is used in presence of a labelled data and when the labelled data is absent then the polarity method is implemented, wherein data is labelled using the polarity method by assigning a polarity score, wherein based on the polarity score the data is further labelled automatically and the labelled data is used to train a supervised machine learning model;

cluster the set of pre-processed key phrases based on frequency of one or more incoming words comprised in the one or more key phrases to obtain a clustered dataset;

classify the clustered dataset based on a polarity score into one or more categories;

identify one or more events and one or more topics classified as a negative category amongst the one or more categories, wherein the one or more events are identified by analyzing extracted textual content and images occurring within a defined time window of a day using a burst-event detection approach based on a feature-pivot clustering technique;

identify an active period of an incident event on a social-media platform by identifying a bursty feature over the defined time window using a feature-based Gaussian distribution, grouping the identified bursty features based on similarity and determining one or more hot periods corresponding to the bursty feature, wherein a transfer-based framework is configured to identify the incident event and perform unsupervised pre-training and the machine-learning model is invoked for execution;

group the one or more events and the one or more topics using an associated label and a frequency of an incoming content stream from the at least one source to obtain a set of grouped entities;

generate, an alert by analyzing a largest group of data items having negative polarity, wherein the alerts are generated based on frequency of social media complaints;

rank and assign a risk score to each entity from the set of grouped entities based on one or more event ranking rules;

identify one or more high-risk events from the set of grouped entities based on the assigned risk score;

analyze the one or more high-risk events by using one or more simulation and optimization techniques; and generate, via the one or more hardware processors, an explainability text pertaining to the one or more high-risk events upon analysing the one or more high risk events, wherein the explainability text provides a reason or justification of the identified one or more high risk events, wherein the generated explainability is either local to a geography, applicable globally or time based.

6. The system of claim 5, wherein the one or more topics are identified using one or more statistical techniques.

7. The system of claim 5, wherein one or more events comprised in the set of grouped entities are ranked based on at least one of an associated criticality value and an associated importance value.

8. The system of claim 5, wherein the risk score is assigned based on at least one of a frequency and a severity associated with each entity from the set of grouped entities.

9. One or more non-transitory machine-readable information storage mediums comprising one or more instructions which when executed by one or more hardware processors cause:

receiving one or more key phrases extracted from at least one source, wherein receiving the one or more key phrases comprises collecting data and content from social sensor sources including social media sites, news media outlets, satellite imagery repositories via an Application Programming Interface (API), wherein key and value pairs are defined in the API;

pre-processing, via the one or more hardware processors, the one or more key phrases to obtain a set of pre-processed key phrases, wherein the pre-processing includes a real-time event extraction and operatively communicating through the API, wherein an interface is facilitated to enter a predefined monitoring and a search criteria of the one or more key phrases, wherein the step of pre-processing includes creating a data frame, creating a configuration file, wherein the configuration file is based on the key and value pairs defined as a file name and a experiment name, wherein the set of pre-processed key phrases is cleansed before using by a system based on the key and value pairs defined including a text column name, a target variable, a polarity method, wherein the target variable and the polarity method is dependent on each other, wherein the target variable is used in presence of a labelled data and when the labelled data is absent then the polarity method is implemented, wherein data is labelled using the polarity method by assigning a polarity score, wherein based on the polarity score the data is further labelled automatically and the labelled data is used to train a supervised machine learning model;

clustering the set of pre-processed key phrases based on frequency of one or more incoming words comprised in the one or more key phrases to obtain a clustered dataset;

classifying the clustered dataset based on a polarity score into one or more categories;

identifying one or more events and one or more topics classified as a negative category amongst the one or more categories, wherein the one or more events are identified by analyzing extracted textual content and images occurring within a defined time window of a day using a burst-event detection approach based on a feature-pivot clustering technique;

identifying an active period of an incident event on a social-media platform comprises identifying a bursty feature over the defined time window using a feature-based Gaussian distribution, grouping the identified bursty features based on similarity and determining one or more hot periods corresponding to the burst, wherein a transfer-based framework is configured to identify the incident event and perform unsupervised pre-training and the machine-learning model is invoked for execution;

grouping the one or more events and the one or more topics using an associated label and a frequency of an incoming content stream from the at least one source to obtain a set of grouped entities;

generating, an alert by analyzing a largest group of data items having negative polarity, wherein the are alerts generated based on frequency of social media complaints;

ranking and assigning a risk score to each entity from the set of grouped entities based on one or more event ranking rules;

identifying one or more high-risk events from the set of grouped entities based on the assigned risk score; and analysing the one or more high-risk events by using one or more simulation and optimization techniques; and generating, via the one or more hardware processors, an explainability text pertaining to the one or more high-risk events upon analysing the one or more high risk events, wherein the explainability text provides a reason or justification of the identified one or more high risk events, wherein the generated explainability is either local to a geography, applicable globally or time based.

10. The one or more non-transitory machine-readable information storage mediums of claim 9, wherein the one or more topics are identified using one or more statistical techniques.

11. The one or more non-transitory machine-readable information storage mediums of claim 9, wherein one or more events comprised in the set of grouped entities are ranked based on at least one of an associated criticality value and an associated importance value.

12. The one or more non-transitory machine-readable information storage mediums of claim 9, wherein the risk score is assigned based on at least one of a frequency and a severity associated with each entity from the set of grouped entities.

13. The processor implemented method of claim 1, wherein the key and value pairs of the API comprises a consumer key, a consumer secret, an access token, access secret, days ago, a geo code, a longitude, a latitude, a radius, max tweets, keyword search and the experiment name, wherein the search criteria includes latitude, longitude, key words and time parameter, social news and media sites, wherein the pre-processing includes removal of special characters, uniform resource locators, wherein the one or more key phrases are tokenized to remove stop words, wherein the one or more events are identified using an entity, topic clustering and incidence peak detection, wherein risk is assessed as combination of hazard and vulnerability, wherein vulnerability is damages and values assessment of elements at risk, wherein a report for the incident event includes a start time of the event, a detection time, and a set of corresponding comments related to an event topic.

14. The processor implemented method of claim 1, wherein the transformer-based framework is configured to perform the unsupervised pre-training using a Bidirectional Encoder Representations from Transformers (BERT)-like framework, and the transformer-based framework employing scaled dot-product self-attention to identify correlations between input segments, thereby enabling real-time event detection, wherein the self-attention operation is used for downstream tasks including an incident event sentiment classification and prediction.

\* \* \* \* \*